United States Patent [19]

Popall et al.

[11] Patent Number: 5,360,834
[45] Date of Patent: Nov. 1, 1994

[54] PROCESS FOR PHOTOINITIATED CONTROL OF INORGANIC NETWORK FORMATION IN THE SOL-GEL PROCESS

[75] Inventors: Michael Popall, Würzburg; Jochen Schulz, Veitshöchheim; Helmut Schmidt, Zellingen, all of Germany

[73] Assignee: Fraunhofer-Gesellschaft Zur Forderung Der Angewandten Forschung e.V., Munich, Germany

[21] Appl. No.: 188,746

[22] Filed: Jan. 31, 1994

Related U.S. Application Data

[63] Continuation of Ser. No. 893,949, Jun. 4, 1992, abandoned, which is a continuation of Ser. No. 553,607, Jul. 18, 1990, abandoned.

[30] Foreign Application Priority Data

Aug. 1, 1989 [DE] Germany .................. 3925462

[51] Int. Cl.$^5$ .................. C08G 4/00; C08G 77/02; C08J 3/28; C08K 3/18
[52] U.S. Cl. .................. 522/36; 522/37; 522/40; 522/42; 522/43; 522/44; 522/45; 522/46; 522/53; 522/60; 522/172; 522/2; 430/270; 430/302
[58] Field of Search .................. 522/2, 31, 40, 42, 43, 522/44, 45, 46, 53, 60, 62, 172, 37, 36; 430/270, 302

[56] References Cited

U.S. PATENT DOCUMENTS

| | | |
|---|---|---|
| 4,101,513 | 7/1978 | Fox et al. .................. 522/31 |
| 4,746,366 | 5/1988 | Philipp et al. .................. 428/447 |
| 4,906,710 | 3/1990 | Burns et al. .................. 522/172 |
| 4,948,843 | 8/1990 | Roberts et al. .................. 525/342 |
| 4,975,472 | 12/1990 | Motegi et al. .................. 522/40 |
| 5,064,877 | 11/1991 | Nass et al. .................. 522/172 |
| 5,095,044 | 3/1992 | Hüsler et al. .................. 522/36 |
| 5,204,143 | 4/1993 | Nishimiya et al. .................. 427/387 |
| 5,233,006 | 8/1993 | Wolter et al. .................. 528/32 |

*Primary Examiner*—Susan W. Berman
*Attorney, Agent, or Firm*—Oblon, Spivak, McClelland, Maier & Neustadt

[57] ABSTRACT

A process is described for photoinitiated control of inorganic network formation in the sol-gel process, which comprises either A) subjecting one or more hydrolytically polycondensable compounds of constituent elements of glass or ceramic, excluding silicon compounds containing polymerizable organic groups, to hydrolytic polycondensation in a liquid reaction medium to form a sol and irradiating the resulting sol in a structured or unstructured manner in the presence of a photoinitiator which can change the pH of the reaction medium on irradiation, using radiation of a wavelength range in which the photoinitiator absorbs;

or

B) liberating water in an anhydrous reaction medium which contains an alcohol, one or more hydrolytically polycondensable compounds of constituent elements of glass or ceramic and a photoinitiator which can liberate water by a photochemical reaction or a secondary reaction when irradiated, by structured or non-structured irradiation using radiation of a wavelength range in which the photoinitiator absorbs, and in this way effecting the hydrolytic polycondensation.

11 Claims, 1 Drawing Sheet

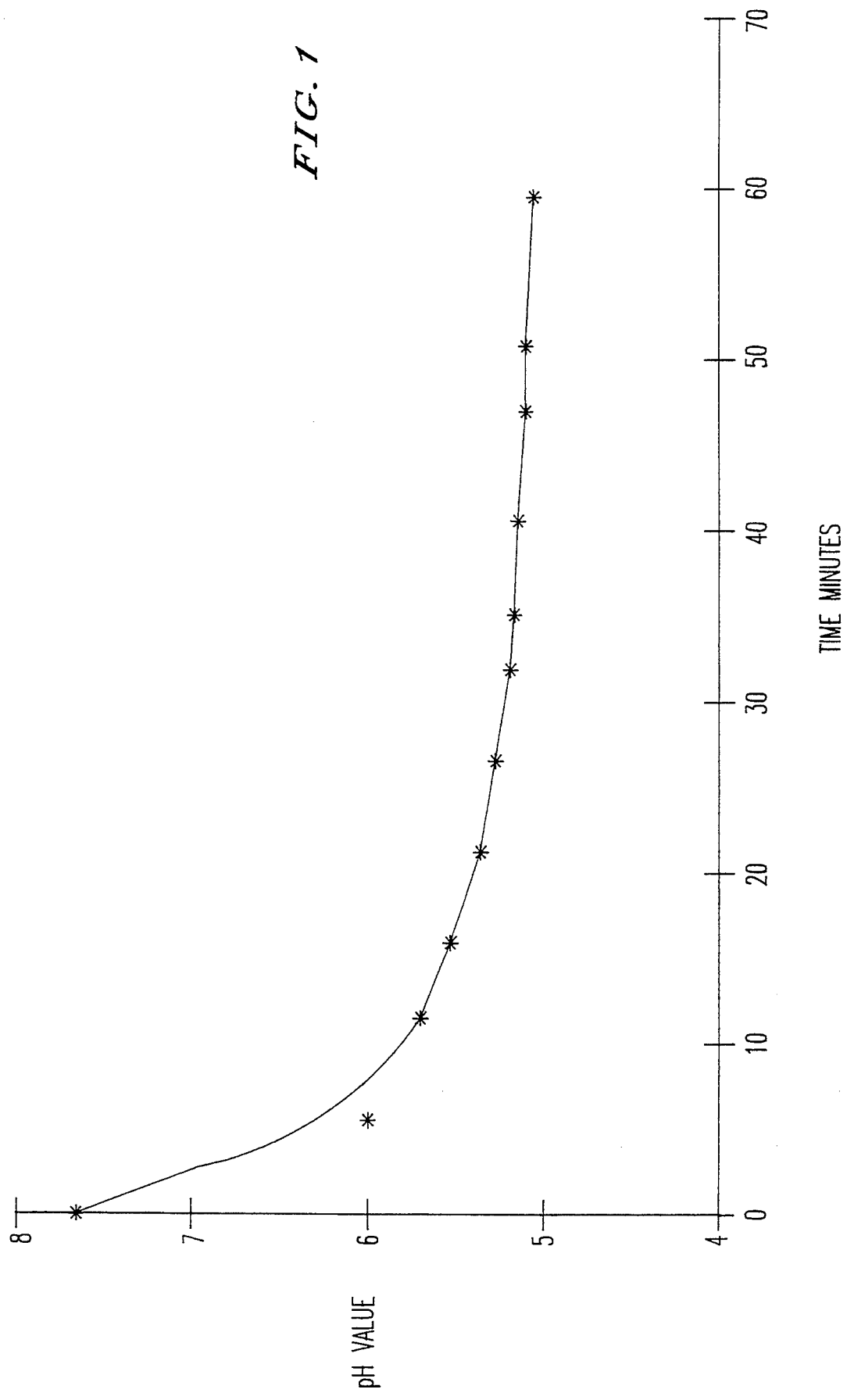

PROCESS FOR PHOTOINITIATED CONTROL OF INORGANIC NETWORK FORMATION IN THE SOL-GEL PROCESS

This application is a continuation of application Ser. No. 07/893,949, filed on Jun. 4, 1992, now abandoned, which is a continuation of Ser. No. 07/553,607 filed Jul. 18, 1990, now abandoned.

BACKGROUND OF THE INVENTION

The present invention relates to a photochemically catalyzed process for controlling the sol-gel process, with which structured or non-structured stress-free coatings and shaped articles can be produced, in particular those which can be converted into glasses or ceramics purely by heat treatment.

Hydrolytic polycondensation by the sol-gel process is a process which is well-known in the prior art for production of amorphous inorganic networks which can be converted into glasses, ceramics and inorganic-organic hybrid materials (see, for example, H. Schmidt, J. Non-Crystall. Solids, 100 (1988), page 51, C. J. Brinker, loc. cit. page 31 and J. Fricke. loc. cit. page 169).

Monomeric or precondensed hydrolyzable and condensable compounds having an inorganic central atom are hydrolyzed and precondensed by adding water and if appropriate catalyst, until a sol forms; condensation to a gel is then carried out, usually by adding a pH-active catalyst. The gel can be converted into the abovementioned materials by treatment with heat and/or radiation.

For many uses, such as, for example, in microelectronics and optoelectronics and in the production of optical materials and fiber materials, a controlled initiation or reaction procedure in the sol-gel process and structuring of the material produced thereby is indispensable. A non-structured retarding influence is required for stress-free production of coatings and massive shaped articles.

Control of the course of the reaction (hydrolysis and condensation reactions to give the inorganic network) was previously possible only by changing the reaction temperature and/or adding catalysts. These two possibilities of control have the following disadvantage:

Temperature control:

On heating up, which accelerates the sol-gel process, and on cooling, which retards the process, temperature gradients are formed which cause an uncontrolled reaction gradient. Heating up is limited by the boiling or evaporation properties of the solvents of the sol-gel process. High spatial resolution of the heat supply, such as is necessary for structuring a shaped article or a coating, cannot be achieved because of the thermal conduction.

Catalysts:

Catalysts for accelerating or retarding the sol-gel process have an effect immediately after they are added, that is to say an acceleration or retardation of the reactions of the sol-gel process already starts before thorough mixing is achieved. Uncontrollable inhomogeneities develop as a result. This behavior also prevents the use of these catalysts for coatings in which the cross-linking of the inorganic constituents is to take place only on the substrate. Controlled structuring is not possible by means of this process.

The only possibility of effecting structuring in coatings which have been prepared by the sol-gel process hitherto consisted in introducing photochemically active organic substituents into the starting compounds and irradiating these or prepolymers thereof in a structuring manner. These processes have been used for material coatings which are to be structured. However, the introduction of these photochemically active substituents limited the temperature stability of the sol-gel materials considerably.

Another problem which can be overcome only with difficulty using the prior art is selective initiation of the polycondensation of highly reactive compounds of ceramic-forming elements. The addition of water, which must be performed very carefully, to avoid premature precipitation of the hydroxides, is carried out in this case by processes which are difficult to control, such as addition of carriers charged with moisture or by absorption from an atmosphere charged with moisture.

SUMMARY OF THE INVENTION

The object of the invention is therefore to provide a process which allows selective control of the inorganic network formation in the sol-gel process, so that acceleration or retardation of the process or structuring of the polycondensation product formed can be carried out.

This object is achieved according to the invention by a process for the photoinitiated control of inorganic network formation in the sol-gel process, which comprises either A) subjecting one or more hydrolytically polycondensable compounds of constituent elements of glass or ceramic, excluding silicon compounds containing polymerizable organic groups, to hydrolytic polycondensation in a liquid reaction medium to form a sol and irradiating the resulting sol in a structured or unstructured manner in the presence of a photoinitiator which can change the pH of the reaction medium on irradiation, using radiation of a wavelength region in which the photoinitiator absorbs;

or

B) liberating water in an anhydrous reaction medium which contains an alcohol, one or more hydrolytically polycondensable compounds of constituent elements of glass or ceramic and a photoinitiator which can by a photochemical reaction or a secondary reaction when irradiated, by structured or non-structured irradiation using radiation of a wavelength region in which the photoinitiator absorbs, and in this way effecting the hydrolytic polycondensation.

Definitions

Alkyl radicals for the purpose of this invention are, for example, straight-chain, branched or cyclic radicals having 1 to 20, preferably 1 to 10, carbon atoms and in particular lower alkyl radicals; lower alkyl radicals contain 1 to 6, preferably 1 to 4, carbon atoms.

Examples of alkyl are dodecyl, octadecyl and lower alkyl radicals, such as methyl, ethyl, n-propyl, isopropyl, n-butyl, isobutyl, sec-butyl, t-butyl, n-pentyl, N-hexyl, cyclopentyl and cyclohexyl.

The alkoxy, alkoxyalkoxy, acyloxy, alkylamino, dialkylamino, alkoxycarbonyl and alkylcarbonyl radicals are derived from the abovementioned alkyl radicals. Specific examples are: methoxy, ethoxy, n- and i-propoxy, n-, sec- and t-butoxy, isobutoxy, $\beta$-methoxyethoxy, acetyloxy, propionyloxy, monomethylamino, monoethylamino, dimethylamino, diethylamino, methylcarbonyl, ethylcarbonyl, methoxycarbonyl and ethoxycarbonyl.

Halogen denotes fluorine, chlorine, bromine or iodine.

"Structured irradiation" in this Application means that irradiation is carried out through masks, diaphragms or stencils or using one or more point light sources (for example lasers), so that only part of the coating or article is irradiated. This results in a structure which manifests itself in a crosslinking and therefore density gradient, or in that the parts which have not been activated by the irradiation can be removed by means of a suitable solvent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings:

FIG. 1 is a graph of pH of a sol versus time of light exposure which shows that upon increasing time of exposure of a sol to ultraviolet radiation, the pH of the sol decreases.

PREFERRED EMBODIMENTS

Compounds capable of undergoing polycondensation

Constituent elements of glass or ceramic are elements of main groups Ia to Va and sub-groups IIb to VIIIb of the periodic table, preferably Si, Al, B, Pb, Sn, Ti, Zn and Zr, and the lanthanides, for example Ce, La, Y and Nd. The elements phosphorus, arsenic, antimony, bismuth, chromium, molybdenum, tungsten, manganese, iron, cobalt, nickel and vanadium and the alkali metals and alkaline earth metals can also be present as a mixture with these.

Preferred compounds of silicon which are employed in the process according to the invention have the general formula (I)

$$R_{4-x}SiR^1_x \quad (I)$$

in which x is 0 to 3, the radicals R, which can be identical or different are hydrolyzable radicals, such as hydrogen, hydroxyl, halogen, alkoxy, alkoxyalkoxy, acyl, acyloxy, alkoxycarbonyl or $NR'_2$ ($R'=H$ and/or alkyl) and the radicals $R^1$, which can be identical or different, are non-polymerizable, non-hydrolyzable organic groups, such as alkyl, phenyl, phenylalkyl and alkylphenyl, which are unsubstituted or substituted by halogen or $NR_2$, it being possible for these radicals to be interrupted by O or S atoms or the group —NR'—.

Specific examples of the groups R are methoxy, ethoxy, n- and i-propoxy, n-, sec- and t-butoxy, isobutoxy, β-methoxyethoxy, acetyloxy, propionyloxy, monomethylamino, monoethylamino, dimethylamino, diethylamino, N-ethylanilino, methylcarbonyl, ethylcarbonyl, methoxycarbonyl and ethoxycarbonyl.

Specific examples of the groups $R^1$ in formula (I) are methyl, ethyl, 3-aminopropyl, 5-chloropentyl, 3-phenylethyl, chlorophenyl, 4-aminophenylmethyl and 4-i-propylphenyl.

Concrete examples of compounds of the formula (I) are:

$x=0$: $Si(OCH_3)_4$, $Si(OC_2H_5)_4$, $Si(O-n-$ or $-i-C_3H_7)_4$, $Si(OC_4H_9)_4$, $SiCl_4$, $HSiCl_3$, $Si(OOCCH_3)_4$ $x=1$: $CH_3$—Si—$Cl_3$, $CH_3$—Si—$(OC_2H_5)_3$, $C_2H_5$—Si—$Cl_3$, $C_2H_5$—Si—$(OC_2H_5)_3$, $C_3H_7$—Si—$(OCH_3)_3$, $(CH_3O)_3$—Si—$C_3H_6$—Cl, $(CH_3O)_3$—Si—$C_3H_6$—$NH_2$, $(C_2H_5O)_3$—Si—$C_3H_6$—$NH_2$, $H_2N$—$CH_2$—$CH_2$—NH—$C_3H_6$—Si—$(OCH_3)_3$, $H_2N$—$CH_2$—$CH_2$—NH—$CH_2$—$CH_2$—NH—$C_3H_6$—Si—$(OCH_3)_3$ $x=2$: $(CH_3)_2$—Si—$Cl_2$, $(CH_3)_2$—Si—$(OC_2H_5)_2$, $(C_2H_5)_2$—Si—$(OC_2H_5)_2$, $(C_2H_5O)_2(CH_3)Si$—$C_3H_6$—$NH_2$ $x=3$: $(CH_3)_3$—Si—Cl, $(C_2H_5)_3$—Si—Cl, $(t-C_4H_9)(CH_3)_2$—Si—Cl

These silanes are commercial products in some cases, or they can be prepared by known methods: compare W. Noll, "Chemie und Technologie der Silicone (Chemistry and Technology of the Silicones)", Verlag Chemie, Weinheim/Bergstrasse (1968).

Compounds of the formula (I) which contain radicals which can be polymerized by heat and/or photochemically can also be employed in the process variant according to the invention in which the water required for hydrolysis is produced photochemically. Examples of such radicals are substituted or unsubstituted alkenyl and alkynyl radicals, for example straight-chain, branched or cyclic radicals having 2 to 20, preferably 2 to 10, carbon atoms and at least one C—C double or triple bond, and in particular lower alkenyl radicals and alkynyl radicals, such as vinyl, 1- and 2-propenyl, butenyl, isobutenyl, styryl and propargyl. Radicals $R^1$ having activated C—C multiple bonds, for example groups which contain a methacryl or acryl radical, are particularly preferred. Preferred examples which may be mentioned of radicals which contain an epoxy group are glycidyloxyalkyl, in particular those having 1 to 4 carbon atoms in the alkyl part. γ-Glycidyloxypropyl is a particularly preferred example. Concrete examples of polymerizable compounds of the general formula (I) which are employed according to the invention are γ-(meth)acryloxypropyltrimethylsilane, vinyltrichlorosilane, vinyltrimethoxysilane, vinyltriacetoxysilane, vinyltriethoxysilane, vinyl-tris(β-methoxyethoxy)silane, trimethoxy-1-propen-3-ylsilane, triethoxy-1-propen-3-ylsilane, and γ-glycidyloxypropyltrimethoxysilane and $(H_3CO)_3$—Si—$(CH_2)_2$ Silicon compounds in which x is $>0$ are starting compounds for inorganic-organic hybrid materials. According to the invention, they are not employed by themselves but as a mixture with silicon compounds of the formula (I) in which x is 0, or with compounds of the other elements used to form glass or ceramic.

Compounds of aluminum which can be used according to the invention are compounds of the general formula $$AlR^2_3 \quad (II)$$

in which the radicals $R^2$, which can be identical or different, are halogen, alkyl, alkoxy, acyloxy or hydroxyl, it being possible for all or some of the groups just mentioned to be replaced by chelating ligands which contain oxygen atoms at the complexing sites. Such chelating ligands are, for example, acetylacetone or ethyl acetoacetate.

Aluminum salts of inorganic or organic acids, such as, for example, $HNO_3$, $H_2SO_4$, $H_3PO_4$ and formic acid, acetic acid, propionic acid and oxalic acid, can also be employed. In this case, complexing with a chelating ligand is likewise preferred.

Concrete examples of aluminum compounds which are preferred according to the invention are Al(OCH$_3$)$_3$, Al(OC$_2$H$_5$)$_3$, Al(O-n-C$_3$H$_7$)$_3$, Al(O-i-C$_3$H$_7$)$_3$, Al(OC$_4$H$_9$)$_3$, Al(O-i-C$_4$H$_9$)$_3$, Al(O-sec-C$_4$H$_9$)$_3$, AlCl$_3$, AlCl(OH)$_2$, aluminum formate, aluminum acetate and aluminum oxalate and the corresponding (partly) chelated compounds, such as, for example, the acetylacetonates. Compounds which are liquid at room temperature, such as, for example, Al(O-sec-C$_4$H$_9$)$_3$ and Al(O-i-C$_3$H$_7$)$_3$, are particularly preferred.

Another group of hydrolytically polycondensable compounds which are preferably employed according to the invention comprises those of the general formula (III)

$$MR^3{}_4 \qquad (III)$$

in which M represents titanium or zirconium and the radicals R$^3$, which can be identical or different, denote halogen, alkoxy or acyloxy, it being possible for all or some of these groups to be replaced by chelating ligands, and/or an oligomer derived therefrom. In respect of the chelating ligand, the comments already made for the aluminum compounds apply.

Concrete examples of titanium or zirconium compounds of the formula III are TiCl$_4$, ZrCl$_4$, Ti(OC$_2$H$_5$)$_4$, Ti(OC$_3$H$_7$)$_4$, Ti(O-i-C$_3$H$_7$)$_4$, Ti(OC$_4$H$_9$)$_4$, Ti(cresyl)$_4$, Zr(O-i-C$_3$H$_7$)$_4$, Zr(OC$_4$H$_9$)$_4$, Ti(acetylacetonato)$_2$(O-i-C$_3$H$_7$)$_2$, Zr(acetylacetonato)$_4$, Ti(2-ethylhexoxy)$_4$ and other titanium or zirconium complexes with chelating ligands, which preferably coordinate via oxygen and/or nitrogen.

Other hydrolytically polycondensable compounds which have not yet been mentioned specifically above and can advantageously be employed according to the invention include oxides, which are soluble in the reaction medium and have a low volatility, or compounds of elements of main groups Ia to Va or of sub-groups IIb, IIIb or Vb to VIIIb of the periodic table which form such oxides of low volatility. These are preferably derived from the following elements: alkali metals, such as Na, K and Rb; alkaline earth metals, such as Mg and Ca; B, Sn, Pb, P, As, Sb, Bi, Cr, Mo, W, Mn, Fe, Co, Ni, Zn, V and lanthanides, such as Co, La, Y or Nd.

Compounds which form oxides which are soluble in the reaction medium and have a low volatility are, for example, inorganic acids, such as phosphoric acid and boric acid, and esters thereof. Other suitable compounds are, for example, hydroxides, such as NaOH, KOH and Ca(OH$_2$), halides, such as SnCl$_4$ and PCl$_5$, and alkoxides, such as Ca(OR)$_2$, Sn(OR)$_4$ and VO(OR)$_3$, R being derived from lower alcohols, such as methanol, ethanol, propanol or butanol.

Other starting compounds which can be used are the corresponding salts with volatile acids, for example acetates, such as nickel acetate, basic acetates, such as basic lead acetate, and formates.

All the compounds employed according to the invention can also be in precondensed form if appropriate.

Other mixtures of reaction components which are particularly preferred for the production of an inorganic network are described, for example, in EP-A-171,493.

Photoinitiation

An essential aspect of the present invention is the use of an initiator or catalyst for the polycondensation which, in a photochemical reaction or a secondary reaction with the reaction medium, either changes the pH thereof or liberates water and in this way influences the formation of the inorganic network in a controlled manner with respect to time and space.

Suitable photoinitiators are compounds having ketone or ketal functions, such as Irgacure 184 (1-hydroxycyclohexyl phenyl ketone), Irgacure 500 (1-hydroxycyclohexyl phenyl ketone + benzophenone), Irgacure 907 (2-methyl-1-[4-(methylthio)phenyl]-2-morpholinopropan-1-one) and other photoinitiators of the Irgacure type obtainable from Geigy; Darocur 1173 (2-hydroxy-2-methyl-1-phenylpropan-1-one), Darocur 1116 (1-(4-isopropylphenyl)-2-hydroxy-2-methylpropan-1-one), Darocur 1664 (mixtures of aryl ketones of the benzophenone type) and Darocur 1398, 1174 and 1020 (obtainable from Merck), benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone; and peroxides, such as, for example, dibenzoyl peroxide and t-butyl perbenzoate. These photoinitiators lower the pH of the reaction medium. Peroxydicarbonates and azobisisobutyronitrile, for example, are also suitable.

An absorption range of these photoinitiators in general lies between about 190 and 360 nm. Thus, for example, 1-hydroxycyclohexyl phenyl ketone has absorption bands at 250 and 350 nm and t-butyl perbenzoate has an absorption band at 290 nm.

The rate of reaction of the polycondensation process greatly depends on the pH (see E. J. A. Pope, J. Non-Cryst. Solids, 87 (1986), pages 185–198). Acid or base catalysis is required for an optimum condensation reaction. Conventional catalysts are organic or inorganic acids, such as hydrochloric acid and acetic acid, and organic and inorganic bases, such as ammonia, alkali metal and alkaline earth metal hydroxides and amines which are soluble in the reaction medium. A spatially variable influencing the pH which would ensure a change in the reaction rate thus having a structuring effect cannot be achieved in this way. A retardation or acceleration of the entire reaction at a time when it can no longer be stirred is just as impossible in this way.

In the polycondensation reaction of very reactive reaction mixtures for preparing ceramics, an initial control of the reaction can be achieved only with difficulty in the conventional manner. A spatially variable influencing of the initial reaction cannot be performed in that manner.

The photoinitiators according to the invention only become effective on irradiation, as a result of which they can either reduce or increase the pH of the sol at the exposed areas and therefore can either accelerate or retard the condensation reaction; or they ensure the liberation of water at the exposed areas and in this way already control the hydrolytic polycondensation in the initial stage.

The mechanism of the pH reduction or pH increase is still unclear. In any event, however, a reaction probably takes place between the photoinitiated radical and water and/or alcohol in the first step, as explained in the following reaction scheme using carbonyl compounds as an example:

R$_3$—COOH. + H$^+$  or  R$^3$—COOH + H.

-continued and/or

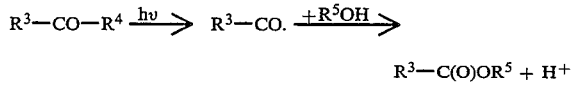

$$R^3-C(O)OR^5 + H^+$$

The radicals $R^3$ and $R^4$ are the organic radicals, attached to the carbonyl groups, of the abovementioned photoinitiators containing carbonyl groups. The radical $R^5$ is any desired organic radical of an alcohol.

Various reaction procedures can be carried out for influencing the pH:

a) The sol which has been obtained by precondensation under conventional conditions and is provided with a photoinitiator according to the invention is left at or brought to a neutral pH. By irradiation (if appropriate structured), the pH is increased or reduced at the irradiated areas. In both cases the condensation reaction proceeds more quickly at the irradiated areas.

b) The sol which has been provided with a photoinitiator according to the invention is brought to a moderately alkaline pH (preferably up to pH 9). By irradiation (if appropriate structured), the pH is reduced at the irradiated areas, until it becomes close to neutral. The condensation reaction proceeds more slowly at the irradiated areas.

c) The sol which has been provided with a photoinitiator according to the invention is brought to a moderately acid pH (preferably up to pH 4.5). By irradiation (if appropriate structured), the pH is increased at the irradiated areas until it becomes close to neutral. The condensation reaction proceeds more slowly at the irradiated areas.

The change in pH depends on the duration of the irradiation. If it takes longer, it changes by more (see FIG. 1). When the irradiation source is switched off, no further change in pH takes place.

The photoinitiated liberation of water can proceed as follows using peroxides, such as perbenzoates and dibenzoyl peroxide, as photoinitiators in the presence of alcohols:

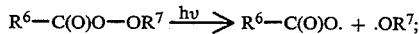

The radical $R^6$ represents a substituted or unsubstituted benzene radical, the radical $R^7$ represents an aliphatic or aromatic ester radical and the radical $R^{5'}$ represents alkyl or cycloalkyl having up to 6 carbon atoms.

In the photoinitiated liberation of water in the presence of an alcohol with the aid of photoinitiators containing carbonyl groups, a cocatalyst which readily eliminates water under acid or alkaline conditions is used. Examples of such compounds are geminal diols, for example hydrates of carbonyl compounds which can be isolated, such as chloral hydrate or 1,1-dihydroxycyclopropane, the hemihydrates of aldehydes having more than 7 C atoms, compounds which contain a hydroxyl group in the α- or β-position relative to at least one carbonyl, carboxyl, nitrile, nitro or sulfonyl group and react to form a conjugated unsaturated system with the elimination of water, for example malic acid and citric acid and esters and nitriles thereof, and tertiary alcohols having an α-hydrogen, such as, for example, tert.-butanol and 1-methylcyclohexan-1-ol.

One possible course of the reaction for liberation of water with the aid of these cocatalysts is as follows:

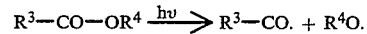

The radicals $R^3$, $R^4$ and $R^5$ are as defined above; the radicals $R^8$ and $R^9$ are the organic radicals of the abovementioned stable geminal diols, it being possible for one of the two radicals to be hydrogen.

Procedure for the Process

Process variant A:

If a photoinitiated pH control of the hydrolytic polycondensation is to take place at the transition stage from sol to gel in the process according to the invention, the sol is prepared in a manner analogous to the manner customary in the sol-gel process. The hydrolysis can thus be carried out with or without a solvent. If the starting compounds are in liquid form, it may be unnecessary to use a solvent. Suitable polar solvents for carrying out the sol-gel process are, for example, lower alkanols, such as methanol, ethanol and isopropanol, ketones, preferably lower dialkyl ketones, such as acetone and methyl isobutyl ketone, ethers, preferably lower alkyl ethers, such as diethyl ether and tetrahydrofuran, amides, such as dimethylformamide, and esters, such as ethyl acetate, and mixtures thereof. Of these, water-miscible solvents or solvent mixtures are particularly preferred.

The photoinitiator is advantageously admixed immediately to the starting compounds, but it can also be added during the hydrolysis process or at the end of it, when the sol state is reached. Nor do the other starting compounds necessarily all have to be already present at the start of the hydrolysis; in certain cases it may even prove to be advantageous if only a portion of these compounds is initially brought into contact with water and the remainder of the compounds is added later.

The amount of photoinitiator employed can vary very widely according to the requirements of the pH change. 2 to 25 percent by weight, with respect to the starting compounds, is in general employed, preferably 10 to 15 percent by weight in the production of coatings and in general 2 to 10, preferably 4 to 7, percent by weight in the production of shaped articles. According to the invention it is also possible to employ more than one photoinitiator. This allows a wide range of variation in density gradients during irradiation with different wavelengths and if appropriate at different times.

The amounts and proportions of the starting compounds depend on the requirements of the desired inorganic network. It can easily be determined by one skilled in the art, if appropriate with the aid of orientating experiments.

In process variant A, the water is added for the purpose of hydrolysis in the manner customary in this field. The starting compounds, if appropriate mixed with the photoinitiator(s), as such or as a solution in one of the abovementioned solvents, can thus be brought into contact with the stoichiometrically required amount of water, but preferably with an excess of water, all at once or stepwise. The hydrolysis is as a rule carried out at temperatures between −20° and 130° C., preferably between 0° and 30° C. or the boiling point of the solvent, if one is used. The best manner of bringing the components into contact depends, inter alia, on the reactivity of the starting compounds employed. Thus, for example, the dissolved starting compounds can slowly be added dropwise to an excess of water, or water is added in one or more portions to the starting compounds, which may also be dissolved. It may also be beneficial for the water not to be added as such but to be introduced into the reaction vessel with the aid of aqueous organic or inorganic systems. In many cases the introduction of the amounts of water into the reaction mixture with the aid of adsorbents charged with moisture, for example molecular sieves, and aqueous organic solvents, for example 80% strength ethanol, has proved to be particularly suitable. The water can also be added via a reaction in which water is formed, for example in the formation of an ester from an acid and an alcohol.

In many cases it is preferred for the water to be added in several stages, for example in three stages. This is done by adding, in the first stage, for example, one-tenth to one-twentieth of the amount of water required stoichiometrically for the hydrolysis. After stirring for a short time, one-fifth to one-tenth of the stoichiometric amount of water is added, and after further stirring for a short time, a stoichiometric amount of water is finally added, so that at the end a slight excess of water is present.

If appropriate, the hydrolysis and sol formation can be carried out with the addition of a conventional catalyst, for example of a compound which eliminates protons or hydroxide ions or of an amine. Examples of suitable catalysts are organic or inorganic acids, such as hydrochloric acid or acetic acid, and organic or inorganic bases, such as ammonia, alkali metal or alkaline earth metal hydroxides, for example sodium hydroxide, potassium hydroxide or calcium hydroxide, and amines which are soluble in the reaction medium, for example lower alkylamines or alkanolamines. Volatile acids and bases, in particular hydrochloric acid, ammonia and triethylamine, are particularly preferred. However, the pH established should not be too low or too high, since it is to be brought to an approximately neutral value, at least in places, by the protons or hydroxide ions liberated by the photoinitiator during the subsequent polycondensation. An upper pH limit of 9 and a lower pH limit of 4.5 are recommended. A higher or lower pH can of course also be approximately neutralized by using correspondingly larger amounts of photoinitiators.

The time required to achieve complete hydrolysis and the sol state depends on the starting compounds employed and the reaction conditions.

The shelf life of the sol depends on its components and its pH. The shelf life is longest at a neutral pH. However, one skilled in the art is familiar with the estimation of these factors.

Before further processing, the excess solvent is carefully distilled off from the sol, if appropriate. If further processing includes coating, under certain circumstances the sol can also be simply allowed to dry.

The sol can now be further processed in the form of a coating, which is obtained by applying the sol to a substrate by the customary coating processes, such as dipping, flooding, pouring, spin-coating, spraying or brushing. All materials which can withstand the temperatures during the later conversion into a glass, a ceramic or a heat-treated inorganic-organic hybrid material are suitable substrates for the production of a coating. Glass, ceramic and metals, for example steel, aluminum and non-ferrous metals, are preferably employed as substrates. If appropriate, the surface of these substrates can be pretreated in a suitable manner before application of the gel, for example by leaching, heating, priming with a primer and corona treatment (to improve adhesion).

The sol can also be further processed as shaped articles. This is done by introducing it, for example, into a suitable casting mold or injection mold which is transparent to UV radiation (for example made of polypropylene or quartz whose adhesion has been reduced) or into a suitable mold of low adhesion which is open at the top, or the sol is shaped by extrusion.

When the sol is in a form of a coating or shaped article, irradiation is performed in either a structured or a non-structured manner. The irradiation is advantageously carried out with a low, medium or high pressure mercury lamp or with one or more lasers. The choice of irradiation wavelength depends on the absorption wavelength range of the photoinitiator employed, the intense absorption bands of which are usually between approximately 190 and 360 nm. If more than one photocatalyst is employed, the irradiation is advantageously carried out with several laser wavelengths which correspond to absorption maxima of the various photocatalysts, simultaneously or at different times, if appropriate for various durations.

The effect of the irradiation on the change in pH has been discussed above. The effects of the irradiation on the material properties are those described below.

If the starting pH was approximately neutral, accelerated polycondensation is effected at the irradiated areas, the acceleration depending on the duration of the irradiation. An inorganic network forms at these areas, whereas under certain circumstances in effect no such network is formed at the non-irradiated areas. The non-irradiated areas can then be dissolved away with a suitable solvent, such as, for example, ethyl acetate, which means that a three-dimensional structure is formed. Structures having gradients in the degree of crosslinking can also be achieved. The irradiated areas then have a higher density than the non-irradiated areas. If various areas are irradiated for different periods of time, a whole scale of density differences can be produced and a complicated density gradient structure can thus be formed. In the case of non-structured irradiation, an acceleration of the entire condensation process is achieved.

If the starting pH was acid or basic, the reaction can be retarded towards the end of the polycondensation by non-structured irradiation by shifting the pH of the gel formed towards the neutral point. Stress-free coatings and in particular stress-free shaped articles can in this way be produced. If the irradiation is structured, the condensation reaction proceeds more slowly at the irradiated areas, and a structure of density gradients is again formed or the irradiated areas can be dissolved away with a suitable solvent, such as ethyl acetate.

After the polycondensation by irradiation, any less crosslinked areas of the gel can be dissolved away from the coating or the shaped article in the process according to the invention. Solvents, such as ethyl acetate, alcohols or methylene chloride and mixtures thereof, are suitable for this. Dilute alkalis, for example 0.2N NaOH, can also be employed for this purpose.

To convert the polycondensed inorganic network produced above into glass, ceramic or hardened inorganic-organic hybrid materials, the above process is followed by a heat treatment, for example at temperatures in the range of 550°–1200° C. (glass), 1300°–2000° C. (ceramic) and 90°–280° C. (inorganic-organic hybrid materials), during which the polycondensate formed is first freed from residues of solvent and water and then annealed or sintered. Any density differences are retained if the temperature is correctly chosen (see, for example, C. J. Brinker et al., J. Non-Crystall. Solids 48 (1982), page 47).

Process variant B:

The control according to the invention of the sol-gel process by photoinitiated elimination of water is preferably applied when using highly reactive compounds of constituent elements of ceramics, in particular aluminum, titanium and zirconium. When less reactive compounds of constituent elements of glass and ceramic are employed, it can of course also be applied. The irradiation in this case is already carried out at the sol formation stage. The polycondensable compounds are dissolved, together with the photoinitiator and if appropriate a cocatalyst which can eliminate water, if possible under an inert gas atmosphere, in an anhydrous alcohol or an anhydrous solvent mixture (the abovementioned solvents being used) which contains alcohol, in general at least 10% by volume. Suitable alcohols are, in particular, primary and secondary alkanols and cycloalkanols having up to 6 carbon atoms, for example methanol, ethanol, n-propanol, isopropanol and cyclohexanol.

The amount of photoinitiator and if appropriate cocatalyst depends on the desired effect. Complete hydrolysis can most suitably be achieved with a photoinitiator/cocatalyst mixture, the photoinitiator in general being present in an amount of 5 to 25% by weight, based on the starting compounds, and the cocatalyst being employed in at least the stoichiometric amount, if appropriate up to five times the stoichiometric amount. If only less than stoichiometric amounts of water are to be liberated, correspondingly less cocatalyst will be employed, or a peroxide, such as a perbenzoate or dibenzoyl peroxide, is used as the sole photoinitiator/water-liberating catalyst.

As soon as the irradiation has started, water starts to form. The hydrolytic polycondensation reaction can be controlled precisely by the duration of the irradiation, which can also be performed at intervals (in the case of photoinitiator and cocatalyst, this control is effected by the pH, and in the case of perbenzoates and dibenzoyl peroxide water is formed exclusively via a secondary reaction of the radical produced photochemically therefrom). Premature precipitation of hydroxide precipitates can thus be avoided. If only some of the water required is liberated photochemically, further water is added in a suitable manner, as described above, after the irradiation. A sol which is further processed to a gel in the conventional manner or the manner described above, that is to say by irradiation, is thus obtained.

The irradiation can also be performed in a structured manner in this case. Structured irradiation, for example in the case of viscous starting solutions, which can be obtained, for example, by long-chain organic groups on the central atoms of the constituent elements of a ceramic (for example n-butoxy, n-hexoxy, 2-ethylbutoxy, 2-ethylhexoxy, 2-ethoxyethoxy or 2-ethoxypropoxy) or by using viscous solvents having a viscosity number >10 mPa.s, leads to the sol having condensation and therefore density gradients due to the varying supply of water. These density differences can be retained by careful evaporation of the solvent and subsequent conversion into the gel. Viscous solvents as defined above are, for example, glycerol, higher alkanols, such as decanol and dodecanol, glycols, such as ethylene glycol, diethylene glycol and triethylene glycol, and poly(ethylene glycol) ethers, such as diethylene glycol dimethyl ether and triethylene glycol dimethyl ether.

Photochemically polymerizable groups, if any are present in the starting compounds employed, are polymerized during irradiation, initiated by the photoinitiator. The influencing described above of the inorganic network takes of course place additionally. During structured irradiation, compacted areas which have a marked density gradient with respect to non-exposed areas, can thus form at the irradiated areas in two ways.

Groups which can be polymerized by heat can be polymerized before, during or after the irradiation, regardless of the influencing of the polycondensation of the inorganic network by the photoinitiator. This polymerization can be effected uniformly in the entire substrate or with thermal gradients, which means that in addition to the structuring of the inorganic network, independent structuring can be achieved by virtue of the different degree of polymerization of the organic groups.

If appropriate, the sols of process variant B can contain an organic monomer or prepolymer which is copolymerizable with the inorganic polycondensation product to improve the elasticity, the mechanical properties and other use properties.

Preferred monomers and prepolymers for this are (meth)acrylic monomers and prepolymers, for example (meth)acrylic esters, such as methyl (meth)acrylate, ethyl (meth)acrylate, butyl (meth)acrylate, cyclohexyl (meth)acrylate, glycidyl (meth)acrylate, ethylene glycol mono(meth)acrylate, diethylene glycol mono(meth)acrylate, triethylene glycol mono(meth)acrylate, allyl (meth)acrylate, 2-ethoxyethyl (meth)acrylate, 2-dimethylaminoethyl (meth)acrylate, ethylene glycol di(meth)acrylate, diethylene glycol di(meth)acrylate, triethylene glycol di(meth)acrylate, butylene glycol (meth)acrylate, neopentylglycol di(meth)acrylate, pentaerythritol tri(meth)acrylate, pentaerythritol tetra(meth)acrylate and trimethylolpropane tri(meth)acrylate, and prepolymers of these monomers. The term "(meth)acryl" relates both to acrylic acid compounds and to methacrylic acid compounds.

However, it is also possible to employ other copolymerizable compounds, for example allyl compounds, such as allyl alcohol and allyl glycidyl ether; N-vinylpyrrolidone; styrene; divinylbenzene; diallyl phthalate; dihydroxy compounds, such as bisphenol A; and amino compounds, such as ε-aminocaproic acid.

The amount of these comonomers is in general 0 to 50, preferably 0 to 30% by weight, based on the weight of the total starting compounds employed.

The process according to the invention thus allows to influence the reactions of the sol-gel process without stirring processes and temperature changes in the system. The structure differences which occur in the resulting polycondensation product due to structured irradiation allow a number of uses:

photostructuring of sol-gel materials by means of photolithography and laser writing, leading to correspondingly structured coatings or shaped articles of glass, ceramic or inorganic-organic hybrid materials;

generation of density gradients (which lead to variations in refractive indices) in sol-gel shaped articles which can be used as non-linear optical materials and optical memories after heat treatment;

production of density gradients in fibrous shaped articles which can subsequently be processed to optical glass fibers;

by additional introduction of an indicator into the reaction which changes color with the pH, glasses and ceramics of a structured color can be produced, these being used, for example, as filters or decorations or in optics.

by means of non-structured irradiation the entire polycondensation process can be accelerated, which results, for example, in a reduction in the polycondensation time for layers of sol-gel material, or can be retarded, which allows, for example, stress-free production of shaped articles made of glass, ceramic or inorganic-organic hybrid materials by the sol-gel process.

The invention is explained in more detail below with the aid of concrete examples:

EXAMPLE 1

Structuring and crosslinking:

20.8 g of tetraethoxysilane are mixed with 7.6 g of water, 20 g of ethanol and 5 g of 1-hydroxycyclohexyl phenyl ketone, while stirring. The mixture is stored in the dark at 45° C. for 5 days. Glass substrates are then coated with this sol. Subsequent irradiation with a medium pressure mercury lamp, a structuring mask being placed between the substrate and lamp, leads to crosslinking of the exposed areas, which, in contrast to the non-exposed areas, cannot be dissolved off on subsequent treatment with ethyl acetate. Structuring of a purely inorganic glass is in this way achieved.

EXAMPLE 2

Control of a reaction by changing the pH:

15.2 g of tetramethoxysilane are mixed with 3.8 g of 0.001N sodium hydroxide solution, 20 g of methanol and 3 g of benzil dimethyl ketal, while stirring. After a reaction time of 30 minutes and after application as a coating on glass or metal (the solvent is first largely dissolved off under gentle conditions), the system is brought to pH 7 by irradiation with a low pressure mercury lamp, so that the subsequent condensation reaction is slowed down significantly and materials which are more stress-free can in this way be produced. Analogously bulk materials can also be prepared with this system by irradiating the gel material, and because of the retarded reaction fewer stresses occur which would lead to cracks during further processing.

We claim:

1. A process for photoinitiated control of inorganic network formation in the sol-gel process; which consists essentially of:

preparing an anhydrous reaction medium of an alcohol, a photoinitiator, a compound which can liberate water under acid or alkaline catalysis and one or more hydrolytically polycondensable compounds of constituent elements of glass or ceramic; and subjecting said medium to structured or non-structured irradiation employing radiation of a wavelength range in which the photoinitiator absorbs, thereby liberating water by a photochemical reaction in situ which effects hydrolytic polycondensation of said one or more polycondensable compounds.

2. The process as claimed in claim 1, wherein said polycondensable compounds are one or more compounds of elements selected from the group consisting of aluminum, titanium and zirconium.

3. The process of claim 1, wherein said irradiation step is conducted at intervals.

4. The process of claim 1, wherein said photoinitiator is a perbenzoic ester or dibenzoyl peroxide.

5. The process of claim 1, wherein said photoinitiator is a photodissociating compound selected from the group consisting of compounds containing a carbonyl or ketal group.

6. The process of claim 1, wherein the photoinitiator is selected from the group consisting of 1-hydroxycyclohexyl phenyl ketone, a mixture of 1-hydroxycyclohexyl phenyl ketone+benzophenone, 2-methyl-1-[4-(methylthio)phenyl]-2-morpholinopropan-1-one, 2-hydroxy-2-methyl-1-phenylpropan-1-one, 1-(4-isopropylphenyl)-2-hydroxy-2-methylpropan-1-one, a mixture of aryl ketones of the benzophenone type, benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone, and dibenzosuberone.

7. The process of claim 1, wherein said compound which eliminates water is a member selected from the group consisting of geminal diols, hemihydrates of aldehydes having more than 7 carbon atoms, compounds which contain a hydroxyl group in the $\alpha$- or $\beta$-position relative to at least one group selected from the group consisting of carbonyl, carboxyl, nitrile, nitro and sulfonyl groups and tertiary alcohols which contain a hydrogen atom in the $\alpha$-position.

8. The process of claim 1, wherein, in addition to the water liberated upon exposure of the reaction medium to irradiation, water is added to the reaction mixture after the irradiation step.

9. The process of claim 1, wherein said reaction medium is irradiated to the extent that polycondensation occurs to the sol state, and then the sol is subjected to further condensation to the gel state.

10. The process as claimed in claim 9, wherein the sol is further irradiated to convert the sol by polycondensation to a gel.

11. The process of claim 9, wherein after the polycondensation the resulting polycondensation product is subjected to a heat treatment in a temperature range of 550°–1200° C. for glass or 1300°–2000° C. for a ceramic or 90°–280° C. for inorganic-organic hybrid materials.

* * * * *